C. PHILLIPS.
ATTACHMENT FOR FEED WATER INJECTORS.
APPLICATION FILED JULY 29, 1905. RENEWED APR. 9, 1909.
939,310.
Patented Nov. 9, 1909.
5 SHEETS—SHEET 2.
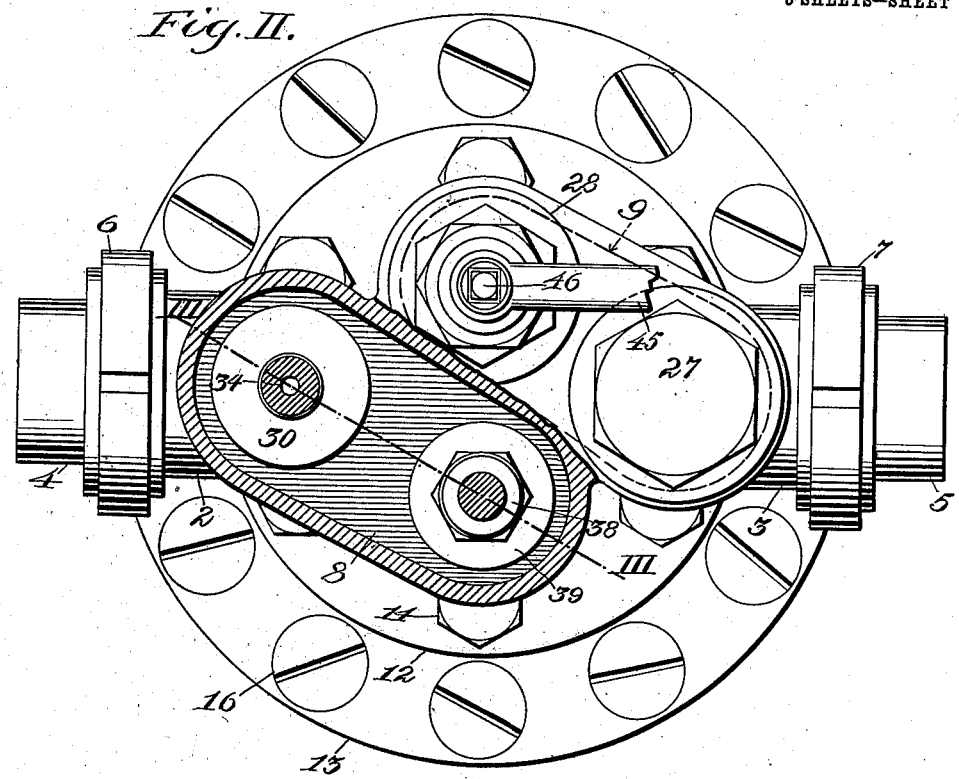
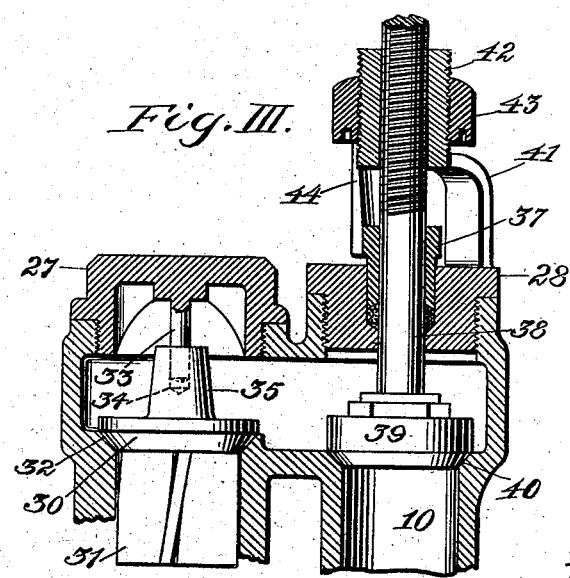
Witnesses:
Ule Binding
M. H. Gates
Inventor:
Columbus Phillips
By Joseph T. Atkins
Atty.

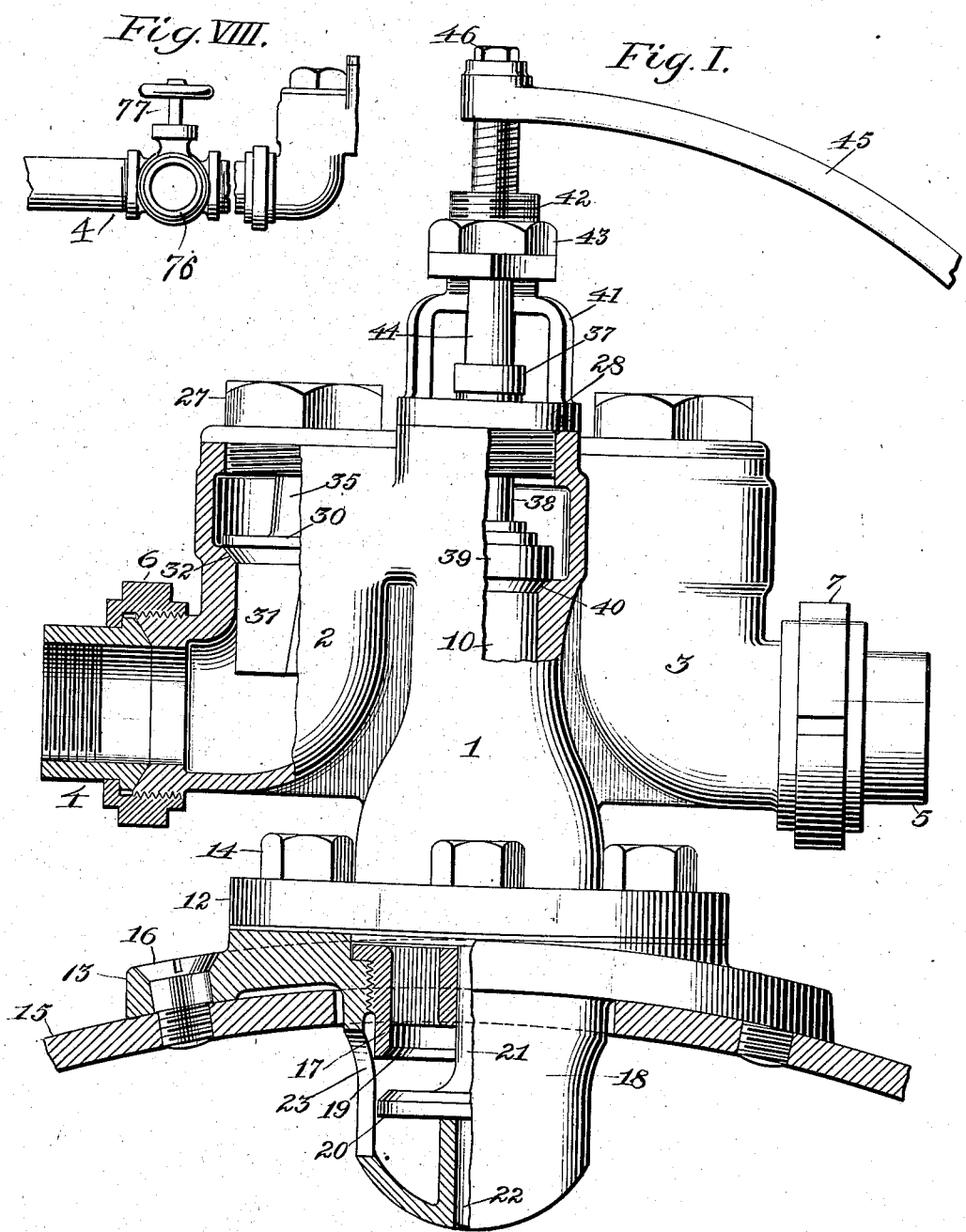

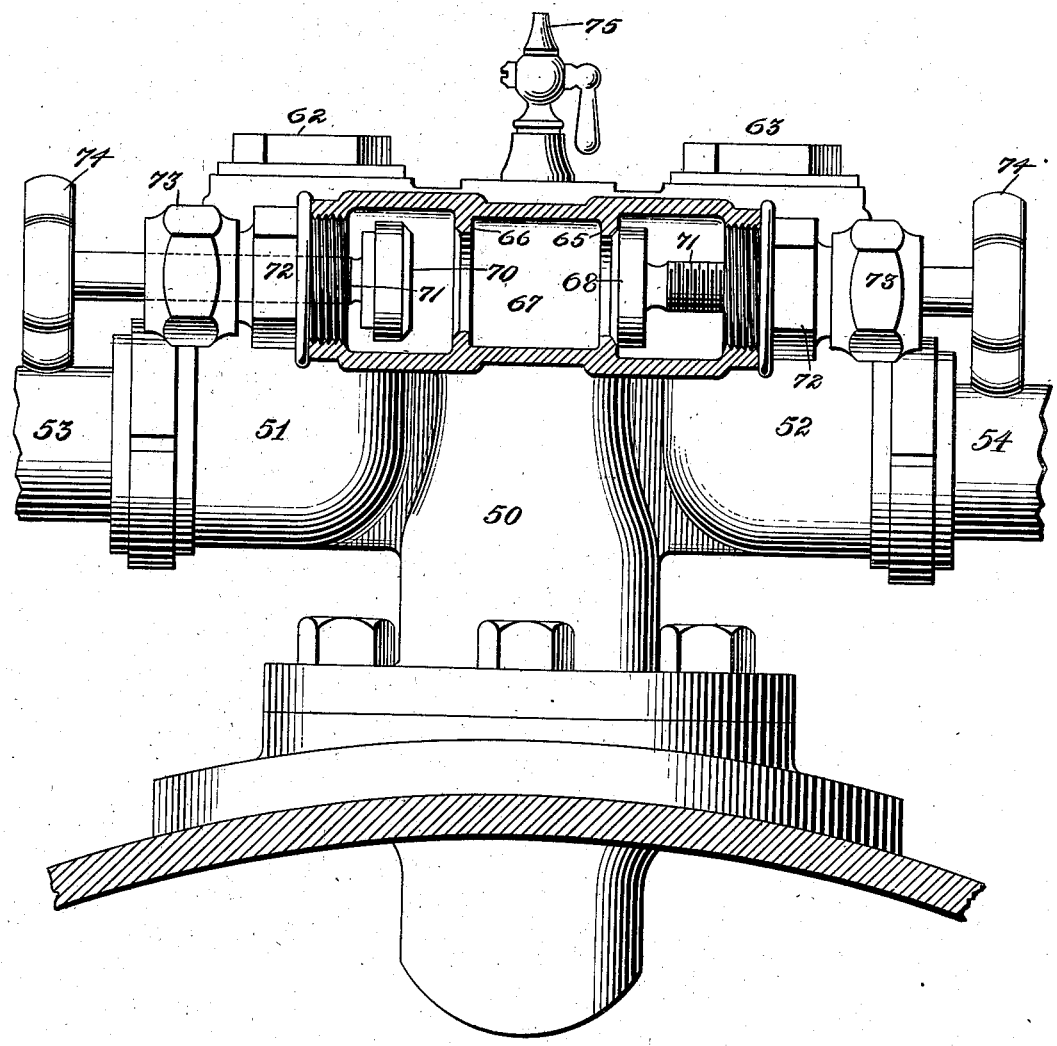

C. PHILLIPS.
ATTACHMENT FOR FEED WATER INJECTORS.
APPLICATION FILED JULY 29, 1905. RENEWED APR. 9, 1909.
939,310.
Patented Nov. 9, 1909.
5 SHEETS—SHEET 4.
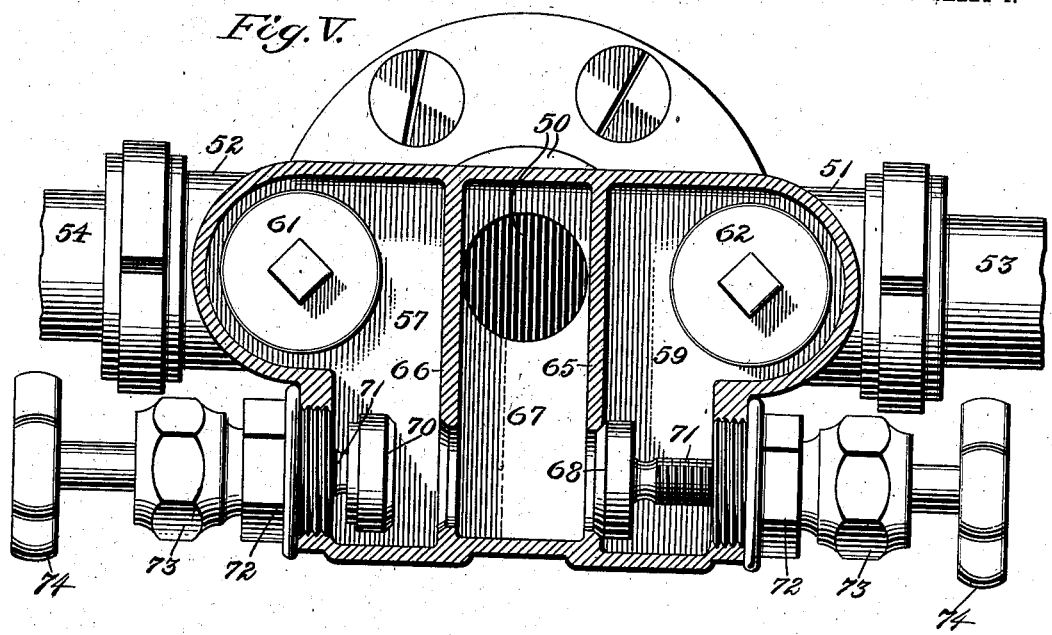
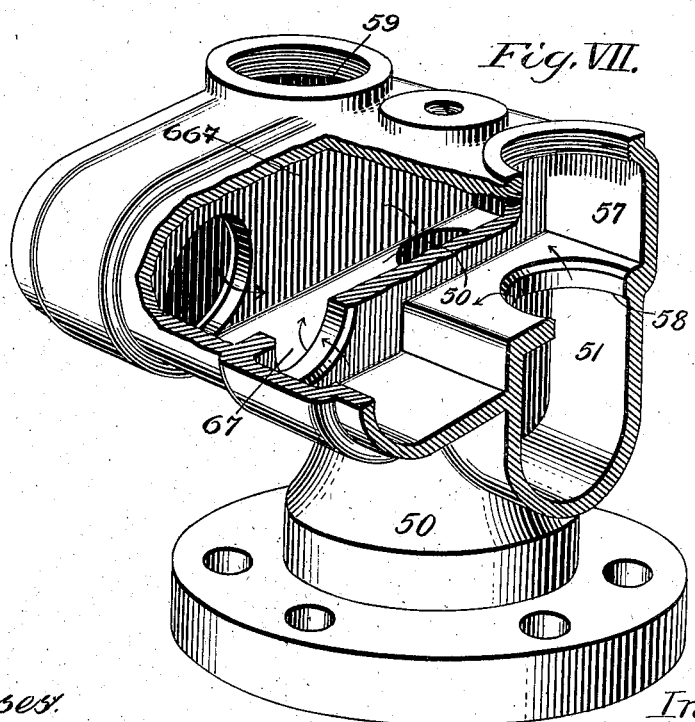

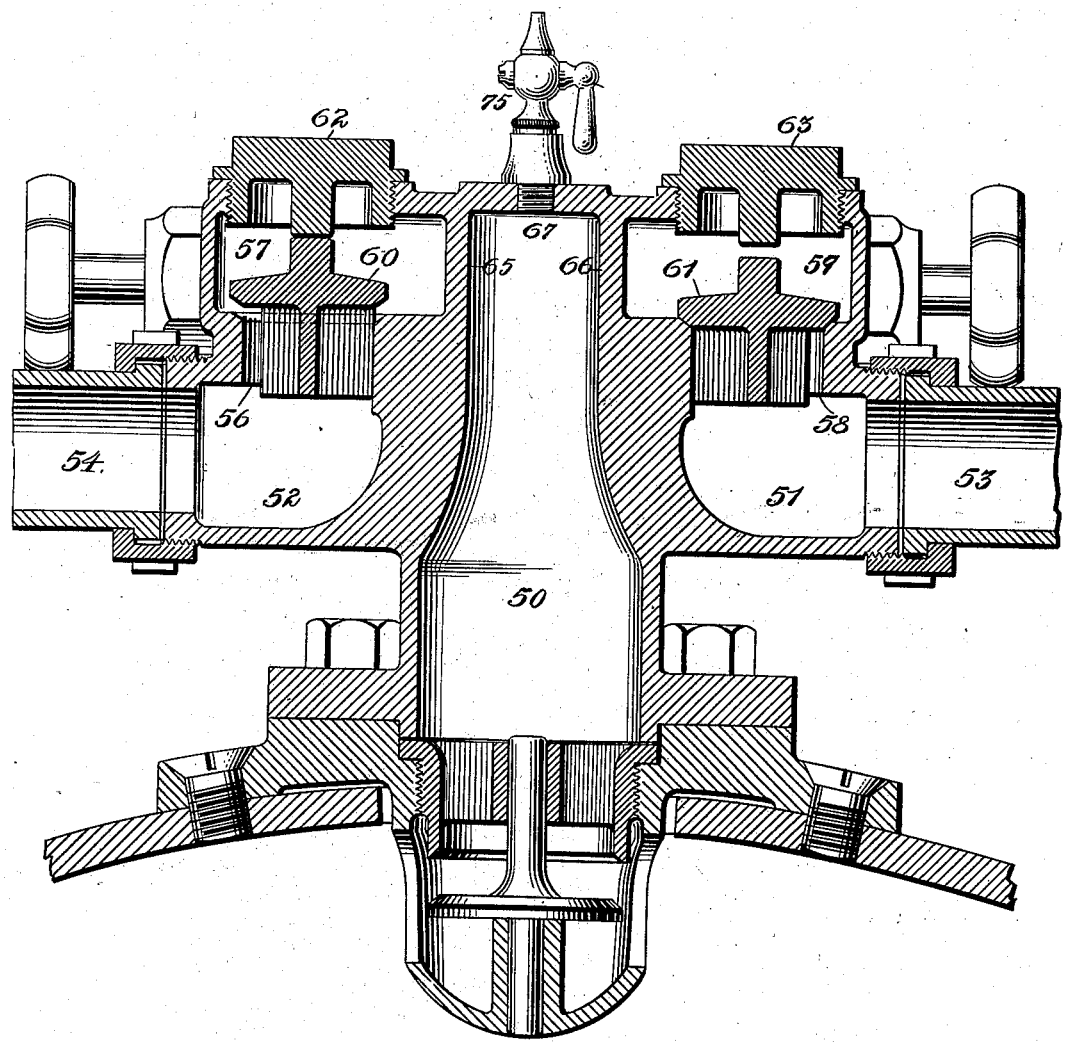

UNITED STATES PATENT OFFICE.

COLUMBUS PHILLIPS, OF MERIDIAN, MISSISSIPPI.

ATTACHMENT FOR FEED-WATER INJECTORS.

939,310.                  Specification of Letters Patent.           Patented Nov. 9, 1909.

Application filed July 29, 1905, Serial No. 271,762. Renewed April 9, 1909. Serial No. 488,875.

*To all whom it may concern:*

Be it known that I, COLUMBUS PHILLIPS, of Meridian, county of Lauderdale, State of Mississippi, have invented certain new and useful Improvements in Attachments for Feed-Water Injectors, of which the following is a specification.

My invention relates to attachments for feed-water injectors for locomotive boilers of the general type shown in my United States Letters Patent No. 660,690, dated Oct. 30, 1900.

Among the objects of my present invention the following may be particularized as of special importance: to produce an attachment for feed-water injectors which can be attached to the boiler of a locomotive preferably so that the valve through which water is admitted to the boiler will be above the water inlets when the valve is open, in which also provision is made for the supply, preferably through the same inlet-valve, of feed-water discharged from a plurality of injectors, and in which provision is made for cutting out any one or all of the injectors, at will. In my patent above referred to means are shown as provided for cutting out both injectors, but such provision necessitates the interruption of the supply of feed-water to the boiler whenever the injectors are cut out. By my present invention I am enabled to cut out one or more but not necessarily all of the injectors, and by that means whenever repairs are necessary in an injector or its connections, it can be cut out of service without interrupting the feed-water supply, which is a feature of great practical utility. Moreover, through employment of means for cutting out the injectors one by one, I provide equipment in a locomotive for producing, at will, a water jet, which may be utilized for extinguishing fires or for other purposes about a locomotive for which the availability of a water jet is applicable. The jet may be attached to an ordinary hose nozzle and thereby rendered available for a variety of purposes.

Another important feature of my invention is in making provision for leading a lever handle from each of the valve stems of the attachment which constitutes my invention, to within easy reach of the locomotive cab, whereby the engineer may, with facility, cut out the injectors with which the attachment is connected in the manner and for the purpose specified.

Referring to the drawings, which constitute a part of this application, Figure I is a side elevation, partly in section, of one and the preferred form of embodiment of my invention, showing one of the feed-water cut-off valves closed, and showing also a preferred form of lever for actuating the same. Fig. II is a top plan view of the subject matter of Fig. I, showing one of the feed-water passages of my device in section. Fig. III is a section of a portion of the subject matter of Fig. II taken on the line III—III thereof, the parts omitted from Fig. II by section being restored and the check-valve and feed-water cut-off valve being in elevation. Fig. IV is a view similar to Fig. I showing a modified form of embodiment of my invention, the feed-water controlling valves both being shown in elevation, one open and the other closed. Fig. V is a horizontal section on the line V—V of Fig. IV, all valves being shown in elevation. Fig. VI is a section on the line VI—VI of Fig. V looking toward the feed-water cut-off valve and showing one of the check-valves open and the other closed, the common check-valve, which is identical with that shown in Fig. I, being open. Fig. VII is a perspective view of the subject matter of Fig. IV, partially in section with all valves omitted and illustrative of the arrangement of the water passages within the body or shell shown therein. Fig. VIII is a detail view illustrating one of the water jet connections, comprehended, as above specified, as coming within the scope of my invention.

Referring to the numerals on the drawings and first to Figs. I to III thereof, 1 indicates the body of shell, which may be of any preferred contour and relative arrangement of parts. Being adapted as an attachment for a plurality of injectors, not illustrated, it is shown as provided with two lateral passages 2 and 3, respectively, which are connected directly with injector pipes represented by flange joints 4 and 5 secured to the passages 2 and 3, respectively, as by spanner nuts 6 and 7, respectively, for whose accommodation any usual or proper provision is made.

The passages 2 and 3 communicate as through parallel diagonally disposed connecting passages 8 and 9 (see Fig. II) with a single main bore 10.

The shell is preferably provided with a flange-base 12, which is secured to a base-plate 13 as by a crown of bolts 14, the base-plate being secured to the boiler-shell 15 as by an annular series of screws 16. The base-plate 13 is provided with a bushing 17, which is threaded to the aperture provided for it, and projects downwardly into the interior of the hood 18, which depends through the boiler-plate 15 from the base-plate 13 with which it is preferably made integral. The bushing 17 is provided with a valve-seat 19 to and from which reciprocates a check-valve 20, whose stems 21 and 22 work in suitable bearing provided for them in the bushing 17 and hood 18. Lateral apertures 23 in the hood 18 permit communication between the interior of the hood and the interior of the boiler. The check-valve is identical in function and substantially identical, with slight structural modifications, in construction with that shown in my previous patent above mentioned.

The passages 8 and 9 are closed, respectively, by a cap-plug 27 and a valve-stem guide-plug 28, a plug 27 and a plug 28 being provided for each passage 8 or 9 (see Fig. III).

The cap-plugs 27 are located respectively above the vertical portion of the bore in the lateral passages 2 and 3, each of which is closed by its respective check-valve 30, which, provided with a guide-apron 31, (see Fig. III) plays between its valve-seat 32 and the cap-plug 27. A guide-pin 33 working in a co-axial aperture 34 in a projection 35 on the top of the valve 30, serves by coöperation with the guide-apron 31 to guide the valve truly to and from its seat.

The valve-stem guide-plug 28 (see Fig. III) is screwed into the shell in co-axial alinement with its branch of the bore 10 thereof. The bore 10 within the lower part of the shell being common to both of the passages 8 and 9 respectively, as specified, is divided into branches or bifurcated so as to afford independent communication with said passages.

Each plug 28 carries within a stuffing-box having a gland 37 as upon a valve-stem 38, a cut-off valve 39, which works to and from its valve-seat 40. Each guide-plug 28 is provided with a spider or skeleton frame 41, which carries an internally and externally threaded cylindrical member 42. The external threads thereof are provided for the accommodation of a jam-nut 43, by which as through arms 44 compressing force may be communicated to the stuffing-box gland 37.

The internal threads are provided for engagement with threads upon the valve-stem 38 for raising and lowering the valve 39 through rotative movement of the valve-stem. Each valve-stem is provided as upon an upwardly projecting square end with a lever 45 secured in place as by a nut 46 upon the end of the valve-stem. Each lever 45 is a depending lever, which is designed to lead in practice a position within easy reach of the engineer in his cab and the pitch of the threads upon the valve-stem 38 is preferably such as to render the valve 40 operative by rotative movement of the lever through the smaller part of a circle. No cab being illustrated or necessary to be illustrated in the drawings, it is deemed sufficient to indicate the general direction of the sweep of the curve of the valve lever 45, which is shown in Fig. I as broken away.

With reference to the operation of my device, let it be assumed that the valves 40 are both open. Under such conditions a feed-water supply under pressure from the injectors is presented through the pipes 4 and 5, respectively. The force behind the feed-water supply afforded by the injectors through the pipes 4 and 5, respectively, lifts the valves 30 and passing them enters the bore 10 of the shell, whence it finds egress around the valve 20 into the boiler. The valve 20 closes under back pressure from the boiler in the manner understood in the art since the issue of my patent above referred to, and the valves 30, aided by gravity, coöperate with it to confine the steam pressure of the boiler, save at such times as the flow of feed-water is forcing its way past the several valves into the boiler.

If at any time it be desired to cut out any one or more of the injectors, all that is necessary is to close the valve 39 as by swing of its lever 45. When that is done, all the avenues of communication on the injector side of the said valve 39 are cut out of service, but without interfering with the operation of the remaining valve or valves 39 of the attachment. Consequently, the injector which communicates with the valve 39 that is closed being cut out, any needed repairs can be made without interrupting the supply of feed-water to the boiler which continues to flow around the valve or valves 39 remaining open.

In Figs. IV to VII inclusive of the drawings, I show an injector attachment operating in accordance with the principle of my invention as above set forth, but with certain modifications as to details of construction. Proceeding to specify the same, it may be observed that the shell, which is indicated by the reference numeral 50 in those figures, may be as to its base and the manner of connecting the same to the boiler-plate 15, substantially identical with the construction previously specified, and does not, therefore, require any additional specification. The illustration in the said figures of the base-plate, the elements depending therefrom, and the mode of connecting them with the boiler-plate 15 are equally applicable also to the matter illustrated in Fig. I.

The shell 50 is provided with lateral passages, which, although substantially identical with the passages 2 and 3, are designated by the special reference numerals 51 and 52. They communicate with feed-water supply pipes 53 and 54, respectively, corresponding with the pipes 4 and 5. The passage 52 communicates through a check-controlled aperture 56 with a chamber 57, and the passage 51 communicates in a like manner through a check-controlled aperture 58 with a chamber 59. The check-valves 60 and 61, which control the openings in the apertures 56 and 58 respectively, correspond to the check-valves 30, previously specified, and are surmounted respectively by screw plugs 62 and 63 screwing into apertures in the shell through which the said check-valves 60 and 61 are accessible, and by said plugs their upward movement is limited. The screw-plugs 62 and 63, respectively, correspond substantially in every respect to the screw-plugs 27 previously specified, though slightly modified in construction by the omission of the guide-pins 33, which is a variation purely optional and non-essential in respect to either of the set of plugs. The chambers 57 and 59 are separated from each other by partition walls 65 and 66, which define between them a middle chamber 67 communicating with the main bore of the shell 50. The partition wall 65 is provided with a valve-seat, to and from which works a cut-off valve 68. In like manner, the partition wall 66 is provided with a valve-seat 69 to and from which works the cut-off valve 70. The valves 68 and 70 are provided respectively with a threaded valve-stem 71, said stems being in each instance identical in construction, which working in a valve-guide plug 72 through a stuffing-box 73, may be operated as by a hand-wheel 74. The mode of operation is substantially the same as that previously described and the illustration of one form of embodiment of my invention may well serve the purpose for which, in part, it is intended, namely, to afford clear explication of the mode of operation of the other part thereof.

75 indicates a pet cock communicating with the inner chamber 67.

It has been specified that one feature of my invention is to provide means for deriving a jet of water from an injector whenever occasion for the use of the same arises. Accordingly, having provided for cutting out either injector, I provide in the injector pipes 4 and 5 respectively (see Fig. VIII) a valve-controlled hose connecting pipe 76. Ordinarily the valve 77 thereof is kept closed. If, however, it be opened the feed-water supplied from the injector connecting therewith, will pass out through the pipe connection and may be distributed in use as through an ordinary nozzle, not necessary to illustrate. The check, which controls the passage with which the injector-pipe so opened to the atmosphere communicates, may serve to cut off back pressure of the boiler, but if preferred, such pressure may be cut off positively by the closing of its appropriate cut-off valve, for example, either of the valves 30, as shown in Figs. I to III of the drawings, or the valves 68 or 70, shown in Figs. V to VII inclusive thereof.

What I claim is:

1. The combination with a shell adapted to be secured to a boiler-shell, and means of communication between the interior of the shell and the interior of the boiler, of a plurality of passages also communicating with the interior of the shell, and communicating, respectively, with a source of feed-water supply, said passages being adapted to be independently cut off from communication with said source of feed-water supply, and means of cutting-off any one or all of said passages from communication with the interior of the shell.

2. The combination with a shell adapted to be secured to a boiler-shell, and means of communication between the interior of the shell and the interior of the boiler, of a plurality of passages also communicating with the interior of the shell, and communicating, respectively, with a source of feed-water supply, said passages being adapted to be independently cut off from communication with said source of feed-water supply, means of cutting-off any one or all of said passages from communication with the interior of the shell, and depending levers for operating said means, respectively.

3. The combination with a shell adapted to be secured to a boiler-shell, provided with check-controlled means of communication with the interior of the boiler, of a plurality of passages also communicating with the interior of the shell and adapted to make communication respectively with a source of feed-water supply, and independent valves for cutting-off communication between said passages and the interior of said shell.

4. The combination with a shell, adapted to be secured to a boiler-shell and provided with a single main bore, and check-controlled means of communication between said bore and the interior of the boiler, of a plurality of passages also communicating with the interior of the shell and adapted to make communication respectively with a source of feed-water supply, and independent valves for cutting-off communication between said passages and the interior of said shell.

5. The combination with a shell provided with a bore and adapted to be secured to a boiler-shell, of a plurality of passages communicating with the bore of the shell, checks controlling said passages respectively, screw plugs in the shell concentric with the checks, respectively, and independent valves intermediate to said bore and said checks, for cutting-off said passages, respectively.

6. The combination with a shell adapted to be secured to a boiler-shell, of a plurality of passages communicating with the interior of the shell, and adapted to make communication respectively with a source of feed-water supply, checks controlling said passages respectively, screw plugs in the shell concentric with the checks, respectively, and independent means of cut-off for said passages, said independent means consisting of plugs screwing into the shell and each operatively carrying a valve adapted to open and close against a valve-seat provided for it in its respective passage within said shell.

7. The combination with a shell provided with a main bore and adapted to be secured to a boiler-shell, of a plurality of passages communicating with the main bore and also with a source of feed-water supply, said passages being adapted to be independently cut off from communication with said source of feed-water supply, check-valves controlling said passages, and independent means in each of the passages intermediate to the check-valves and said main bore for cutting off said passages respectively.

8. The combination with a shell provided with a main bore and adapted to be secured to a boiler-shell, of a plurality of passages communicating with the main bore and also with a source of feed-water supply, said passages being adapted to be independently cut off from communication with said source of feed-water supply, check-valves controlling said passages, and independent shut-off valves in said passages intermediate to the check-valves and said main bore.

9. The combination with a shell provided with a main bore and adapted to be secured to a boiler-shell, of a plurality of passages communicating with the main bore and also with a source of feed-water supply, said passages being adapted to be independently cut off from communication with said source of feed-water supply, check-valves controlling said passages, independent shut-off valves in said passages intermediate to the check-valves and said main bore, and depending levers for operating said shut-off valves, respectively.

10. In a double boiler check valve, a valve casing or body divided internally into two distinct and separate series of chambers, a single delivery chamber also contained in the valve body, and communicating with the terminal chamber of both series, in combination with check valves controlling the communications between the chambers of each series, and a separate and distinct stop valve for controlling the communication between the delivery chamber and the terminal chamber of each series, substantially as set forth.

In testimony whereof I have hereunto signed my name in the presence of two subscribing witnesses.

COLUMBUS PHILLIPS.

Witnesses:
B. F. HINES,
GEO. LYLE.